United States Patent [19]
Eckerd et al.

[11] Patent Number: 5,013,078
[45] Date of Patent: May 7, 1991

[54] TOPPER WITH PIVOTING ROOF PANELS

[76] Inventors: Roger C. Eckerd; Florence L. Beidler, both of Midwest Mobil Home, Box 740, Waukee, Iowa 50263

[21] Appl. No.: 563,536
[22] Filed: Aug. 6, 1990
[51] Int. Cl.⁵ .............................................. B60P 7/02
[52] U.S. Cl. ........................................ 296/100; 296/26
[58] Field of Search ................... 296/100, 27, 26, 210

[56] References Cited

U.S. PATENT DOCUMENTS

| | | | |
|---|---|---|---|
| 2,043,858 | 6/1936 | Moore | 296/100 |
| 3,069,199 | 12/1962 | Reardon et al. | 296/100 |
| 3,858,744 | 1/1975 | Garvert | 296/100 |
| 3,861,737 | 1/1975 | Kirkbride | 296/100 |
| 3,995,890 | 12/1976 | Fletcher | 296/100 |
| 4,284,303 | 8/1981 | Hather | 296/100 |
| 4,832,394 | 5/1989 | Macomber | 296/100 |

Primary Examiner—Robert R. Song
Attorney, Agent, or Firm—G. Brian Pingel

[57] ABSTRACT

A container for enclosing the box of a pick-up truck that includes a pair of sidewalls, a front wall, a rear wall and a roof having two panels connected by hinges to the outer side edges of the sidewalls to permit each of the panels to be pivoted approximately 270° from a closed position to an open position.

5 Claims, 2 Drawing Sheets

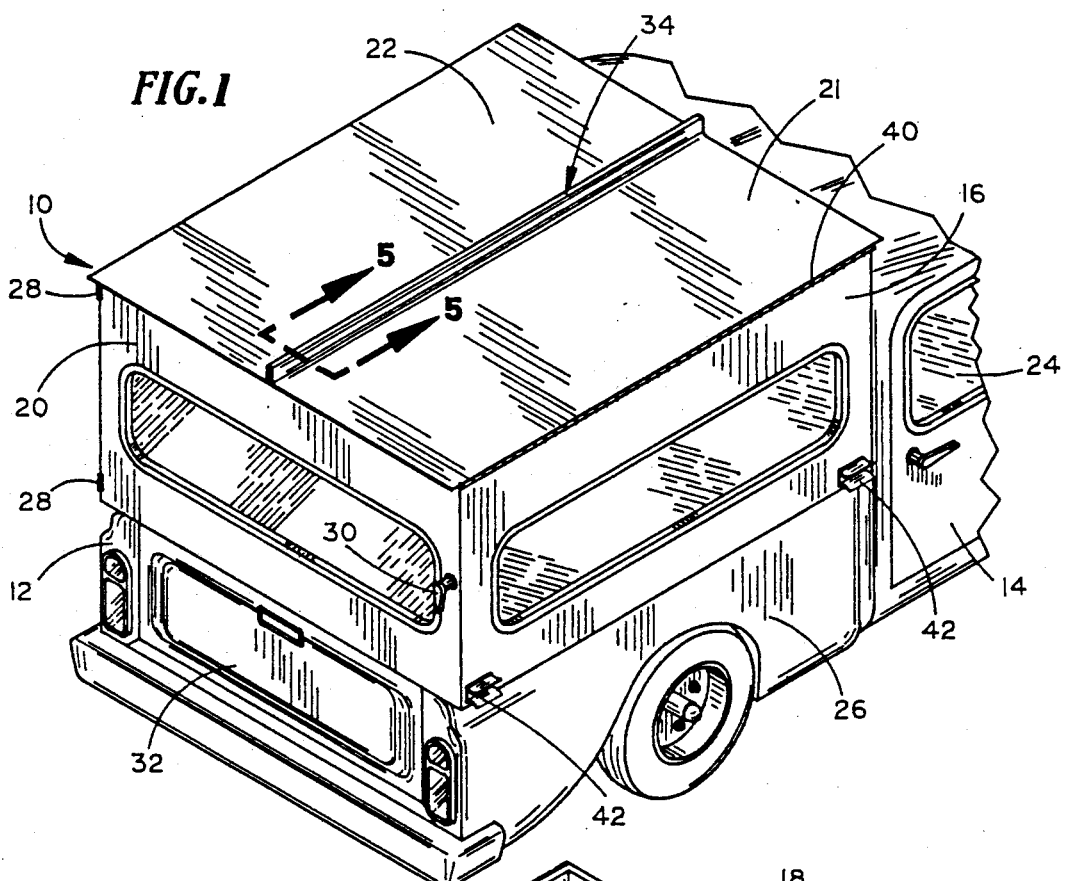
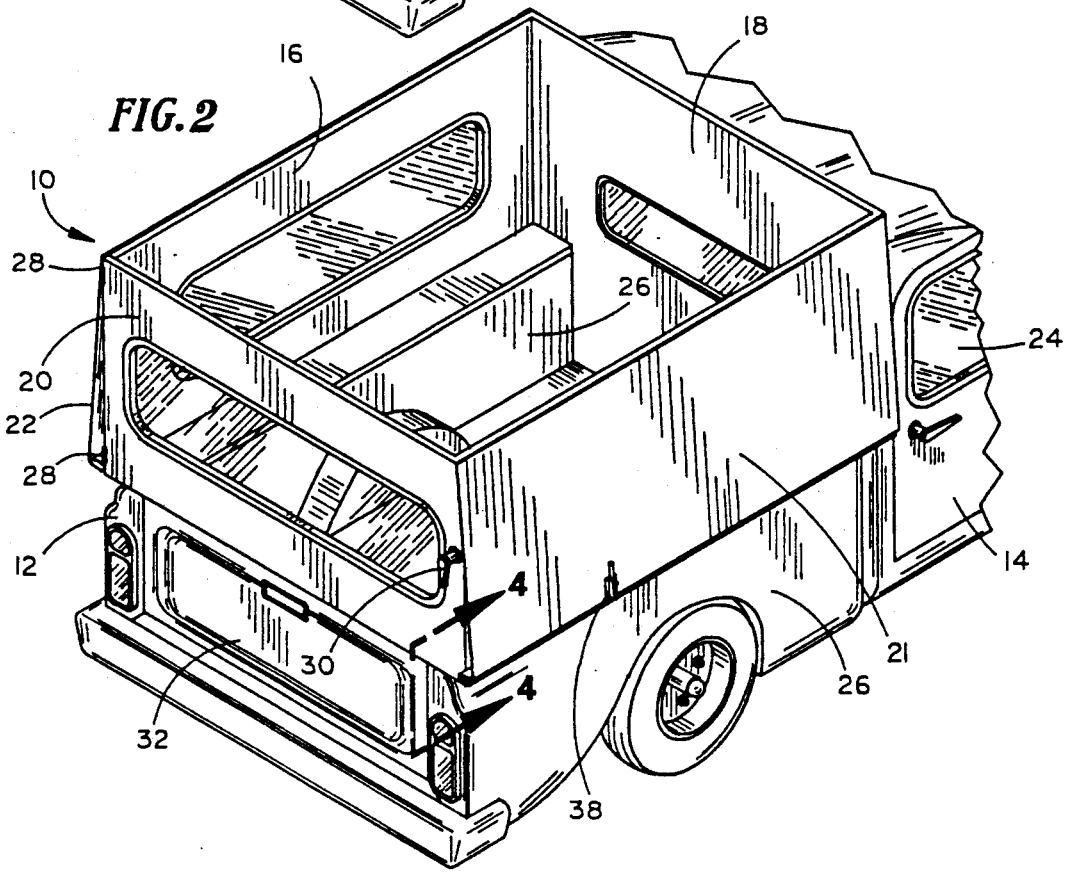

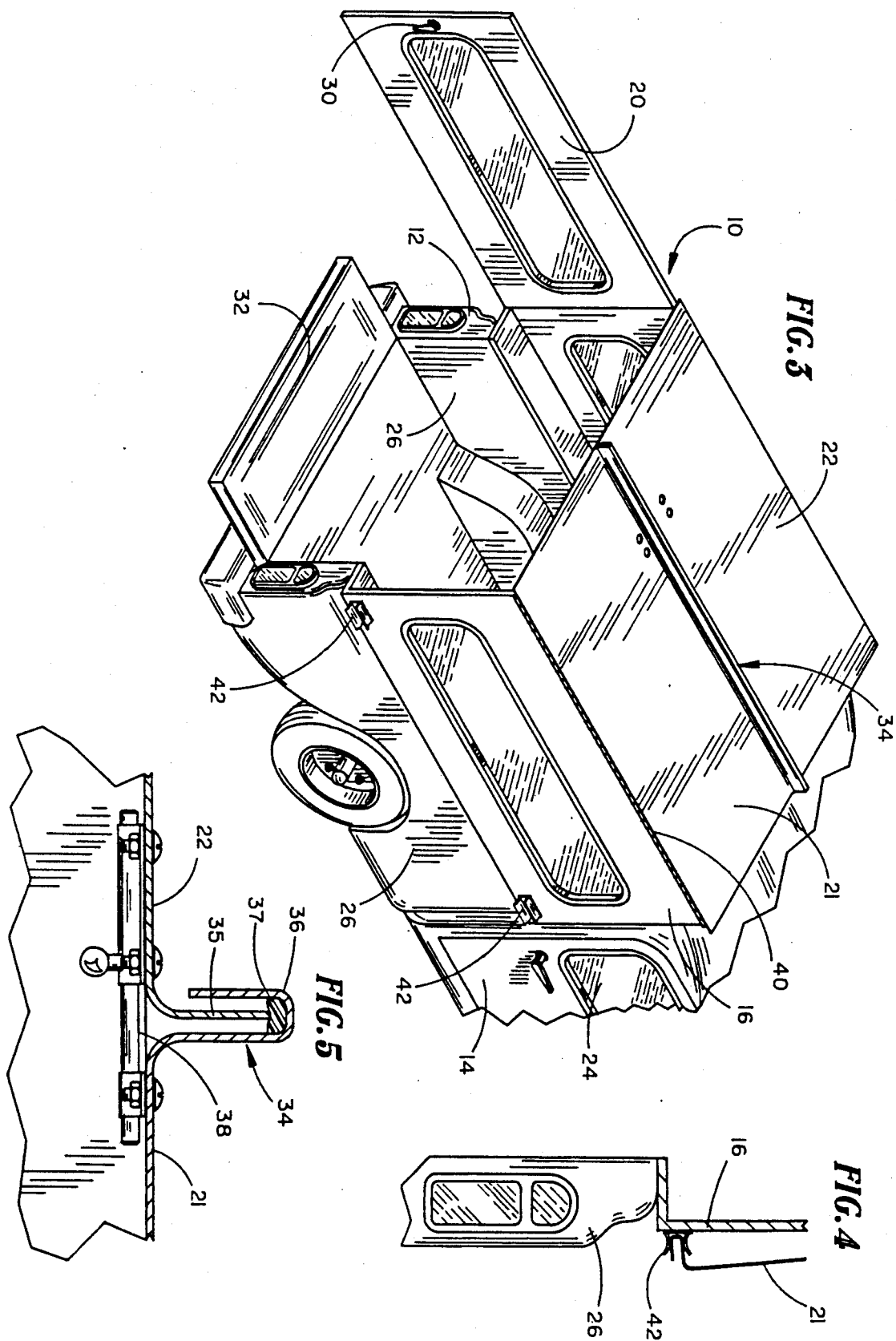

TOPPER WITH PIVOTING ROOF PANELS

BACKGROUND OF THE INVENTION

1. Field of the Invention

The present invention relates to enclosures for the boxes of pick-up trucks and more specifically relates to such enclosures that include a roof that can be opened.

2. Description of the Prior Art

A variety of devices are known in the art for covering the top of a pick-up box or for providing a container employable with a pick-up box and having a roof that can be opened. Such constructions are employed so that the pick-up can be utilized in conventional fashion for hauling large objects without removing the box cover or the container from the pick-up. This is particularly true when the container on the pick-up box is relatively large such as those commonly referred to in the art as a "topper." Usually toppers are relatively heavy and are awkward for removing or installing. Consequently, it is highly desirable to have an adaptable construction for a topper so that the roof will open so the pick-up box can be employed for normal usage.

A known structure for enclosing pick-up boxes is disclosed in U.S. Pat. No. 3,995,890 issued to Fletcher. The Fletcher structure includes a roof formed in two sections that are pivotally secured to the sidewalls by elongated lever arms that are associated with hydraulic rams for opening and closing the roof sections. In U.S. Pat. No. 3,858,744 issued to Garvert, a cover structure is disclosed that includes a pair of panels hinged to sidewall portions of a pick-up box. An associated brace structure is utilized for holding the cover panels in a vertical position, and a strut and a second brace for holding the cover in an outer horizontal position to thus open the box. Various other types of pick-up box enclosures are disclosed in U.S. Pat. Nos. 4,284,303, 4,832,394, and 3,861,737.

Although the above prior art structures provide cover arrangements for pick-up boxes, they are all deficient in the aspect that they do not provide a cover of relatively simplistic construction and operability to permit the cover portions to be readily moved from a closed position to an opened position secured against the sidewalls of the pick-up box.

SUMMARY OF THE INVENTION

A container shaped cover for enclosing the box of a pick-up truck having a pair of oppositely arranged sidewalls supported on and extending the length of the pick-up box, a roof comprised of two laterally extending panels that normally lie in a closed condition to close the container and are moveable to an opened position adjacent the sidewalls of said container. The container further includes a front wall secured to the front ends of said sidewalls, a rear door hinged at one side edge to at least one of said sidewalls at a rear portion thereof, and a hinge means for connecting the outer side edges of the roof panels to the sidewall panels to permit each of the panels to be pivoted approximately 270°.

In a preferred embodiment the cover further includes coacting means on the roof panels to inhibit the passage of moisture therebetween when in a closed condition, and piano hinges associated with each of the roof panels and extend the length of said sidewalls to inhibit the passage of moisture between said sidewalls and said roof panels.

The container further includes sealing means located on the top edges of the front wall and the rear door so that when the roof panels are in the closed position, the passage of moisture is inhibited between said roof panels and said front wall and the rear door. A latch means is associated with the roof panels to lock and stabilize the roof panels in the closed condition, and there is also a latch means associated with the roof panels and the sidewalls of the container to lock the roof panels in an open condition.

BRIEF DESCRIPTION OF THE DRAWINGS

FIG. 1 is a perspective view of the rear portion of a pick up truck on which is positioned a preferred embodiment of a container of the present invention to close the box of said truck;

FIG. 2 is a perspective view similar to that of FIG. 1, but showing the container of FIG. 1 in an open condition;

FIG. 3 is a perspective view similar to that of FIG. 1, but showing a rear door of the container of FIG. 1 in an open condition;

FIG. 4 is a cross-section view taken along the line 4—4 of FIG. 2 and showing a latch mechanism associated with the sidewall of the pick-up box and the top portion of the container of the present invention; and FIG. 5 is a cross-sectional view taken along the line 5—5 of FIG. 1 and showing a sealing flange providing a water resistant seal for the roof of said container.

DETAILED DESCRIPTION OF THE PREFERRED EMBODIMENT

Referring now to FIG. 1, FIG. 2, and FIG. 3, a container 10 of the present invention is shown mounted on a box 12 of a pick-up truck 14. The container 10 is constructed of two oppositely arranged sidewalls 16, a front wall 18, a rear door 20, and two laterally extending roof panels 21 and 22.

As shown in FIG. 2, the front wall 18 is permanently secured to the front ends of the sidewalls 16, and when the container 10 is mounted onto the box 12, the front wall 18 rests contiguous to the rear of a pick-up cab 24. FIG. 1, FIG. 2, and FIG. 3 show the two sidewalls 16 supported on and extending the length of two side panels 26 of the box 12.

One side edge of the rear door 20 is attached to the rear edge of at least one sidewall 16 through the use of two rear hinges 28. The rear hinges 28, as seen in FIG. 1 and FIG. 2, provide a means for allowing the rear door 20 to swing open and shut. When the rear door 20 is in the closed position, as seen in FIG. 1 and FIG. 2, the opposite edge of the rear door 20 adjoins the rear edge of the opposite sidewall 16 through the use of a rear latch 30. Easy access to the closed pick-up box 12 occurs when both the rear door 20 and a tailgate 32 of the box 12 are open. A sealing means such as a polyethylene strip, not shown, is located on the top edge of both the rear door 20 and the front wall 18, and the roof panels 21 and 22, when closed, slightly overlap such edges to restrict the passage of moisture between the roof panels 21 and 22 and the rear door 20 and front wall 18.

When the two roof panels 21 and 22 are in the closed position, as seen in FIG. 1 and FIG. 3, the inner side edges are joined together through the use of a coacting means 34 that serves to inhibit the passage of moisture between the roof panels. The coacting means 34 is formed by a longitudinally aligned flange 35 on the inner side edge of the panel 22 and a similarly aligned channel 36 on the inner side edge of the panel 21 for receiving the flange 35. FIG. 5 shows that within the coacting means 34, a gasket 37 exists to provide increased protection against water leakage within the coacting means 34. FIG. 5 also shows a roof latch 38 in an engaged position beneath and in between the two roof panels 21 and 22. When engaged, the roof latch 38 locks and stabilizes the two roof panels 21 and 22 when they are in a closed position. Prior to opening the two roof panels 21 and 22, the roof latch 38 must be disengaged.

Two piano hinges 40, only one of which is shown, provide a hinge means for connecting the outer side edges of the two roof panels 21 and 22 to the top of the sidewalls 16, thereby permitting each of the roof panels 21 and 22 to be pivoted approximately 270° into a position adjacent to the outside of each sidewall 16. The piano hinges 40 also prevent the passage of moisture between the outer edges of the roof panels 21 and 22 and the top edges of the sidewalls 16. A pair of side clamps 42, located at the lower corners of each sidewall 16, provide a means to secure the roof panels 21 and 22 in an open position adjacent to each sidewall 16. As shown in FIG. 4, the clamps 42 on the right hand side of the container 10 receive and temporarily secure the channel 36. Likewise, similar type clamps 42, not shown, on the left side of the container 10 receive the flange 35.

Although the invention has been described with respect to a preferred embodiment thereof, it is to be understood that it is not to be so limited since changes and modifications can be made therein which are within the full intended scope of this invention as defined by the appended claims.

I claim:

1. A container shaped cover for enclosing a box of a pick-up truck comprising:
   (a) a pair of oppositely arranged sidewalls supported on and extending the length of two side panels of the box;
   (b) a front wall secured to the front ends of said sidewalls;
   (c) a rear door hinged at one side edge to at least one of said sidewalls at a rear portion thereof;
   (d) a roof comprised of two laterally extending panels that normally lie on the top edges of said front and rear walls when in a closed condition to be supported by said front and rear walls; and
   (e) a hinge means for connecting the outer side edges of said roof panels to said sidewalls to permit each of said panels to be pivoted about said hinge means approximately 270° so that each of said panels is positioned in a surface-to-surface relationship with one of said sidewalls when in an open condition.
   (f) coacting means associated with said roof panels to inhibit the passage of moisture therebetween when they are in a closed condition, said coacting means comprised of:
      (1) a flange on the side edge of one of said roof panels; and
      (2) a channel on the side edge of the other of said roof panels for receiving said flange.

2. A cover as recited in claim 1 wherein said hinge means is provided by piano hinges associated with each of said roof panels and that extend the length of said sidewalls to inhibit the passage of moisture between said sidewalls and said roof panels.

3. A cover as recited in claim 2 wherein said front wall and said rear door have a sealing means located on their top edges, and said roof panels overlap said front and rear walls to inhibit the passage of moisture between said roof panels and said front and rear walls.

4. A cover as recited in claim 3 wherein a latch means is associated with said roof panels to semi-permanently lock said roof panels in a closed position.

5. A cover as recited in claim 4 wherein said clamp means are associated with said roof panels and said sidewalls to semi-permanently lock said roof panels in an open condition.

* * * * *